United States Patent
Hodgkins et al.

(10) Patent No.: US 11,851,336 B2
(45) Date of Patent: Dec. 26, 2023

(54) METHOD OF DEALUMINATING ALUMINUM-CONTAINING MATERIALS

(71) Applicant: Saudi Arabian Oil Company, Dhahran (SA)

(72) Inventors: Robert P. Hodgkins, Dhahran (SA); Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 9 days.

(21) Appl. No.: 17/722,485

(22) Filed: Apr. 18, 2022

(65) Prior Publication Data

US 2023/0331564 A1    Oct. 19, 2023

(51) Int. Cl.
 *C01B 39/02* (2006.01)

(52) U.S. Cl.
 CPC ........ *C01B 39/026* (2013.01); *C01P 2002/86* (2013.01)

(58) Field of Classification Search
 None
 See application file for complete search history.

(56) References Cited

U.S. PATENT DOCUMENTS

| | | |
|---|---|---|
| 10,781,168 B2 | 9/2020 | Koseoglu et al. |
| 10,793,782 B2 | 10/2020 | Koseoglu et al. |
| 10,807,947 B2 | 10/2020 | Koseoglu et al. |
| 10,927,318 B2 | 2/2021 | Koseoglu et al. |
| 11,111,212 B2 | 9/2021 | Koseoglu et al. |

OTHER PUBLICATIONS

Chen et al. "Sulfuric acid improves the reactivity of zeolites via dealumination." Construction and Building Materials 264 (2020): 120648.
Sun et al. "Understanding dealumination mechanisms in protonic and cationic zeolites." The Journal of Physical Chemistry C 124.1 (2019): 668-676. https://doi.org/10.1021/acs.jpcc.9b09693.
Valdiviés-Cruz et al. "Full mechanism of zeolite dealumination in aqueous strong acid medium: ab initio periodic study on H-clinoptilolite." The Journal of Physical Chemistry C 121.5 (2017): 2652-2660. https://doi.org/10.1021/acs.jpcc.6b09794.

*Primary Examiner* — Sheng H Davis
(74) *Attorney, Agent, or Firm* — Leason Ellis LLP

(57) ABSTRACT

A dealumination process is provided comprising contacting an aluminum-containing material with an acid medium, wherein the acid medium comprises one or more water-soluble oxidized disulfide oil ODSO compounds, referred to herein as an "ODSO acid" or an "ODSO acid mixture" where the acid is a mixture of ODSO compounds. Advantageously, the use of ODSO reduces the demand for a reagent acid, and instead utilizes a refinery waste stream for the same purpose.

20 Claims, 2 Drawing Sheets

METHOD OF DEALUMINATING ALUMINUM-CONTAINING MATERIALS

FIELD OF THE DISCLOSURE

The present disclosure relates to dealumination of aluminum-containing materials.

BACKGROUND OF THE DISCLOSURE

Various types of aluminum-containing materials benefit from dealumination including aluminum-containing inorganic oxides and aluminum-based metal organic framework materials. Dealumination generally refers to chemical removal of alumina or aluminates from a material, for example from a zeolite in the manufacture of industrial catalysts. In the manufacture of certain zeolites, dealumination is a known post-synthesis method of removing aluminum from the Si and Al zeolite crystalline structure to modify the silica-to-alumina ratio (SAR). This is typically carried out with chemical agents and/or by hydrothermal treatment.

For example, dealumination is known to consist of a partial or total removal of Al atoms from the framework through acid treatment in an aqueous medium. The starting zeolite material is initially converted to its acid form upon treatment with strong acids, bringing about Brønsted acid sites proximate to framework Al atoms. During continued treatment for a longer period of time, the formation of silanol nests occurs. Such processes allow one to "tune" pore dimensions of zeolite materials. See, for example, (a) Valdiviés-Cruz, Karell, Anabel Lam, and Claudio M. Zicovich-Wilson. "Full Mechanism of Zeolite Dealumination in Aqueous Strong Acid Medium: Ab Initio Periodic Study on H-Clinoptilolite." The Journal of Physical Chemistry C 121, no. 5 (2017): 2652-60. https://doi.org/10.1021/acs.jpcc.6b09794; (b) Sun, Jifeng, Hanjun Fang, Peter I. Ravikovitch, and David S. Sholl. "Understanding Dealumination Mechanisms in Protonic and Cationic Zeolites." The Journal of Physical Chemistry C 124, no. 1 (2019): 668-76. https://doi.org/10.1021/acs.jpcc.9b09693.

Aluminosilicates contain oxides of both silicon and aluminum, and the class generally cover a wide range of natural and synthetic material, including those of layered structures, phyllosilicates, and those of three-dimensional networks of covalent bonds, tectosilicates.

Zeolites are tectosilicates, in the form of crystalline solids possessing well-defined structures and uniform pore sizes that can be measured in angstroms (Å). Typically, zeolites comprise framework atoms such as silicon, aluminum and oxygen arranged as silica and alumina tetrahedra. Zeolites are generally hydrated aluminum silicates that can be made or selected with a controlled porosity and other characteristics, and typically contain cations, water and/or other molecules located in the porous network. Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others.

An important parameter for selecting suitable zeolites as heterogeneous catalysts is the acid site properties. The degree of reactant conversion, product yield and selectivity are directly related to the acid sites in the zeolite, which can be the acid site number, strength and distribution. The silica-to-alumina ratio has a dramatic influence on the resulting acidic properties, and concomitantly, the catalyst properties. The acid site locations also influence resulting acidic properties, which can also be dependent on the zeolite framework structure type. Hence, selecting a suitable framework structure, a suitable silica-to-alumina molar ratio in the starting sol-gel considerations to take into account when optimizing the acid sites in zeolites.

An example is zeolite Y (also known as Na-Y zeolite or Y-type faujasite zeolite) is a well known material for its zeolites have ion-exchange, catalytic and adsorptive properties. Zeolite Y is also a useful starting material for production of other zeolites such as ultra-stable y-type zeolite (USY) Like typical zeolites, faujasite is synthesized from alumina and silica sources, dissolved in a basic aqueous solution and crystallized. The faujasite zeolite has a framework designated as FAU by the International Zeolite Association (IZA), and are formed by 12-ring structures and have channels of about 7.4 angstroms (Å). Faujasite zeolites are characterized by a 3-dimensional pore structure with pores running perpendicular to each other in the x, y, and z planes. Secondary building units can be positioned at 4, 6, 6-2, 4-2, 1-4-4 or 6-6. An example SAR range for faujasite zeolite is about 2 to about 6, typically with a unit cell size (units a, b and c) in the range of about 24.30 to 24.75. Faujasite zeolites are considered X-type when the silica-to-alumina ratio (SAR) is between 2 and 3, and Y-type when the SAR is 3 or higher. The faujasite is in its sodium form and can be ion exchanged with ammonium. Calcination is often carried out to acidify the zeolite.

Yet another example is zeolite beta (*BEA as designated by the IZA). Zeolite beta comprises the (*BEA) framework, which includes zeolite beta polymorph A, having a micropore size related to the 12-member rings when viewed along the [100] and [001] directions of 6.6x6.7 Å and 5.6x5.6 Å, respectively. Still another example is ZSM-5 (MFI as designated by the IZA). ZSM-5 comprises the (MFI) framework, having a micropore size related to the 10-member rings when viewed along the [100] and [010] directions of 5.1x5.5 Å and 5.3x5.6 Å, respectively. Another example is zeolite mordenite (MOR as designated by IZA). Zeolite mordenite comprises the (MFI) framework, having a micropore size related to the 12-member rings when viewed along the [001] direction and to the 8-member rings when viewed along the [001] direction of 6.5x7.0 Å and 2.6x5.7 Å, respectively.

The zeolite framework generally comprises repeating tetrahedral unit cells as its framework having silicon, aluminum and oxygen atoms. When trivalent Al substitutes for tetrahedral silica in the framework a negative charge is induced that is counter-balanced by a cation, typically an alkali metal such as $Na^+$. In order for the zeolite to exhibit acidity the sodium cation should be replaced with a proton. The proton associated with counter-balancing the negative charge derived from the framework aluminum results in a Brønsted acid site. Lewis acidity typically results from extra-framework aluminum. Hence, the number of acid sites correlates to a decreased Si/Al ratio (if protons are associated with the cation sites). The intrinsic acidity can be linked to the population of acid sites, with weakening Brønsted sites observed when the influence of proton crowding is elevated. Controlling the acidity of the zeolite is a critical factor when considering its design for specific applications. Changes to the silica-to-alumina ratio (SAR) can result in tailored product outcomes. Fine tuning of the acidity functionality allows control over a critical parameter that may optimize product outcome and maximize profitability. Current methods to fine tune the acid functionality during synthesis include adjusting the ratios of the silica and alumina source during synthesis. However, the desired zeolite silica-to-alumina ratio, in some instances, may not be attained during the synthesis of the zeolite, and thus, post synthetic treatment is required to alter the SAR.

Post synthetic examples can be treatment of a zeolite with a caustic material such as NaOH to etch Si from the zeolite. Alternatively, acids can be used to etch Al from the zeolite. In the refining and petrochemical industry, particularly in hydrocracking and fluid catalytic cracking applications, a common zeolite in use is zeolite Y and USY having the (FAU) framework. It is known for zeolite Y to be synthesized having a silica-to-alumina ratio of <7 as a result of the conditions required to form zeolite Y. Zeolite Y is converted to USY typically through steaming. However, USY is better stabilized by having less Al, that is, a higher SAR, and concomitantly, a higher SAR than that of the prepared zeolite Y/USY materials is more suited to refining and petrochemical applications, for example hydrocracking where a SAR in the range of about 40 is required.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in U.S. Pat. No. 10,807,947, the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream so-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

In regard to the above background information, the present disclosure is directed to provide a technical solution for dealumination of aluminum-containing materials, including zeolites.

SUMMARY OF THE DISCLOSURE

A method for dealuminating an aluminum-containing material is provided. The method comprises contacting the aluminum-containing material with an acid medium comprising one or more water-soluble oxidized disulfide oil (ODSO) compounds, and recovering a dealuminated material. The aluminum-containing material can include, for example, an aluminum-containing inorganic oxide or an aluminum-based metal organic framework material. In certain embodiments, the aluminum-containing material is selected from the group consisting of zeolites, amorphous aluminosilicates, aluminophosphates, silicoaluminophosphates and metal aluminophosphates.

In certain embodiments the dealumination herein results in at least about 1-100, 1-99, 1-90, 1-80, 1-70, 1-60, 5-100, 5-99, 5-90, 5-80, 5-70 or 10-70% of aluminum removal from the aluminum-containing material. In certain embodiments, the aluminum-containing material comprises a zeolite, the dealuminated material comprises dealuminated zeolite, and the dealuminated zeolite has an increased silica-to-alumina molar ratio as compared to a silica-to-alumina molar ratio of the zeolite. In certain embodiments, the silica-to-alumina ratio of the dealuminated zeolite is greater than the silica-to-alumina molar ratio of the zeolite by about 1-200, 1-80, 5-200 or 5-80.

In certain embodiments, the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'), wherein R and R' can be the same or different C1-C10 alkyl or C6-C10 aryl. In certain embodiments, the one or more ODSO compounds are water-soluble ODSO compounds having 3 or more oxygen atoms and include a mixture of two or more compounds selected from the group consisting of (R—SOO—

SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'), wherein R and R' can be the same or different C1-C10 alkyl or C6-C10 aryl. In certain embodiments, the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl. In certain embodiments, the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl. In certain embodiments, a mixture of ODSO compounds corresponds to oxidized disulfide oils present in an effluent refinery hydrocarbon stream recovered following catalytic oxidation of mercaptans present in the effluent refinery hydrocarbon stream.

In certain embodiments, the acid medium for dealumination is provided in an aqueous solution. In certain embodiments, the acid medium for dealumination as in any of the foregoing embodiments further comprising one or more additional acidic components, for example, hydrochloric acid, sulfuric acid, nitric acid, aqua regia, citric acid or acetic acid.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The process of the disclosure will be described in more detail below and with reference to the attached drawings in which the same number is used for the same or similar elements.

Figures 1, 2:
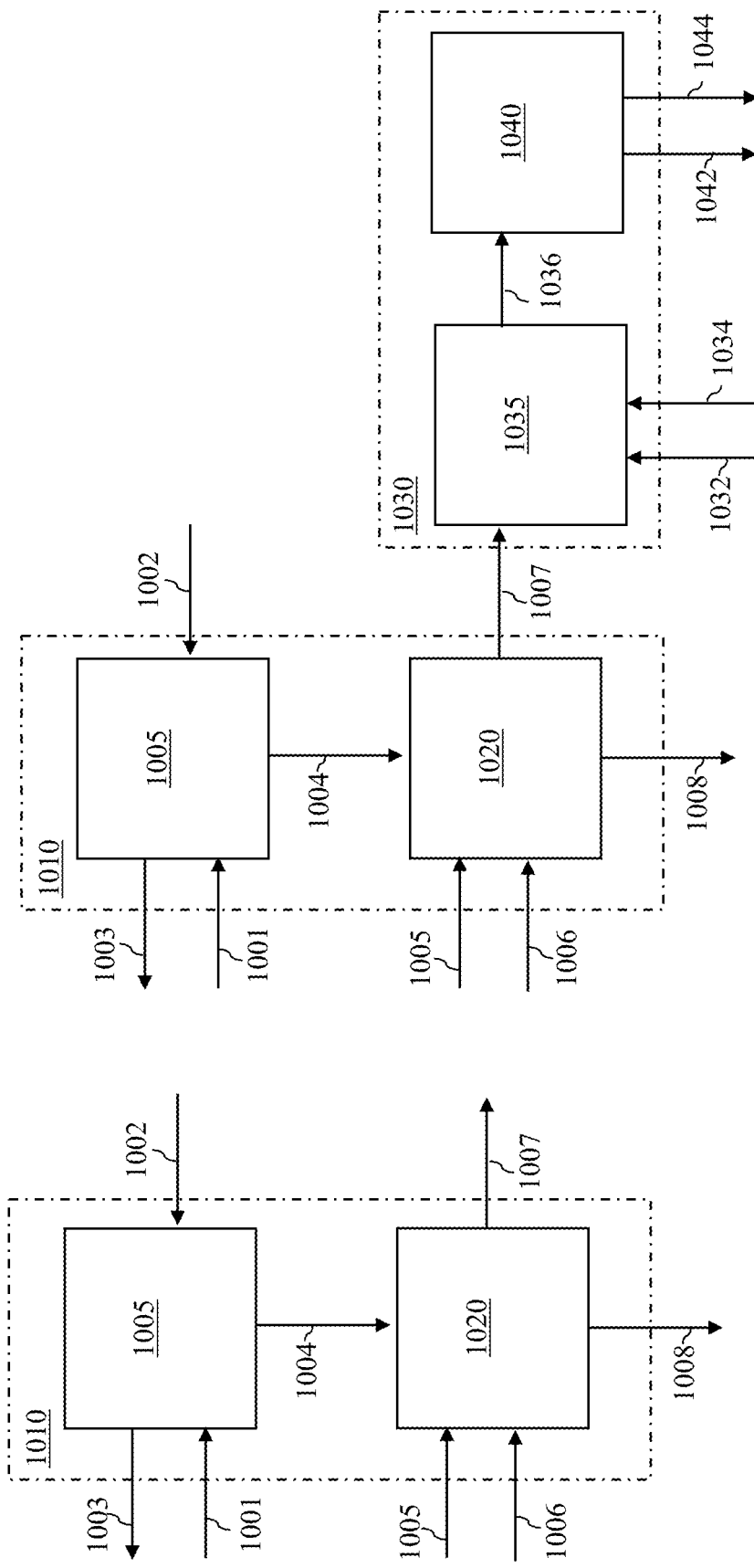
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

DETAILED DESCRIPTION OF CERTAIN
EMBODIMENTS OF THE DISCLOSURE

A dealumination process is provided comprising contacting an aluminum-containing material with an acid medium, wherein the acid medium comprises one or more water-soluble oxidized disulfide oil ODSO compounds, referred to herein as an "ODSO acid" or an "ODSO acid mixture" where the acid is a mixture of ODSO compounds. Embodiments of the present disclosure are directed to a dealumination process comprising contacting an aluminum-containing material with an ODSO acid or ODSO acid mixture medium comprising, consisting of or consisting essentially of one or more polar water-soluble ODSO compounds, including polar water-soluble ODSO compounds present in an effluent refinery hydrocarbon stream recovered following catalytic oxidation of mercaptans present in a petroleum feedstream. Advantageously, the use of ODSO reduces the demand for a reagent acid, and instead utilizes a refinery waste stream for the same purpose.

In a process herein, an ODSO acid or ODSO acid mixture is brought into contact with an aluminum-containing material, such as a zeolite material used in catalyst manufacturing, for dealumination. In certain embodiments, dealumination includes selective removal of aluminum atoms in the framework of the aluminum-containing material. For example, in conventional catalyst manufacturing including use of zeolites, dealumination is carried out with an acid medium for dealumination in one or more process steps. In the process herein, all or a portion of a conventional acid medium used for dealumination is substituted with an effective amount ODSO acid or an ODSO acid mixture.

In certain embodiments, an acid medium is provided that is undiluted from controlled catalytic oxidation of DSO, and includes about 50-100, 75-100, 90-100 percent by mass of one or more ODSO compounds, or an ODSO mixture (referred to herein for convenience as a "neat" ODSO acid medium). In certain embodiments, an acid medium comprises a neat ODSO acid medium that is diluted with water, for instance wherein the neat ODSO acid medium comprises 0.1-99.9, 1-99.9, 5-99.9, 10-99.9, 25-99.9, 50-99.9, 0.1-90, 1-90, 5-90, 10-90, 25-90, 50-90, 0.1-75, 1-75, 5-75, 10-75, 25-75 or 50-75 percent by mass of the overall solution of acid medium. In certain embodiments, an acid medium comprises a neat ODSO acid medium or a diluted ODSO acid medium, mixed with one or more additional acidic components, for example hydrochloric acid, sulfuric acid, nitric acid, aqua regia (a mixture of nitric acid and hydrochloric acid, optimally in a molar ratio of nitric : hydrochloric of 1:3), citric acid or acetic acid. The additional acid is in aqueous diluted form, for example from a solution of 0.1-99.9 percent by mass, which is combined with the neat or diluted ODSO active component carrier composition to form an active component carrier composition herein. In certain embodiments, an acid medium comprises a diluted ODSO acid medium, mixed with one or more additional acidic components (including those listed above); the additional acidic component(s) can be provided in pure (100 percent by mass acid) or in aqueous diluted form, for example from a solution of 0.1-99.9 percent by mass; the pure or diluted acid is combined with the diluted ODSO acid medium to form an acid medium herein used as a dealumination agent.

It will be appreciated by those skilled in the art that the degree of dealumination can be influenced by the pH of the acid medium as a dealuminating agent, and conditions and time of contact between the acid medium and the aluminum-containing material. In certain embodiments, wherein the acid medium used as a dealumination agent herein has a pH less than 7, 4 or 1.

In the process herein, an effective amount of an acid medium including one or more ODSO compounds is used for dealumination of an aluminum-containing material. The effective amount is dependent on, for example, the material to be dealuminated and the desired extent of dealumination. In certain embodiments the effective amount of the acid medium including one or more ODSO compounds is that which is suitable to achieve similar pH levels as a conventional acid medium that is used in the dealumination of the same or similar aluminum-containing material. For example, in some embodiments, the acid is a Brønsted-Lowry acid, and the effective amount of ODSO is that which is donates an equivalent quantity of protons as the conventional acid medium that is being replaced in the dealumination of the same or similar aluminum-containing material. The examples presented below demonstrate that an ODSO acid medium including water soluble ODSO can be used to as a dealuminating agent for dealumination of zeolites. In certain embodiments, the acid medium described (as a neat ODSO acid medium, an aqueous ODSO acid medium, or a mixture of ODSO and other acidic component) herein is provided at relative to the aluminum-containing material at an acid medium to aluminum-containing material ratio, on a mass basis, in the range of about 0.1:1 to 40:1, 0.1:1 to 20:1, 0.1:1 to 10:1, 0.1:1 to 5:1, 1:1 to 40:1, 1:1 to 20:1, 1:1 to 10:1, 1:1 to 5:1, 2:1 to 40:1, 2:1 to 20:1, 2:1 to 10:1 or 2:1 to 5:1.

The aluminum-containing material generally includes aluminum-containing inorganic oxides or aluminum-based metal organic framework materials. In certain embodiments, the aluminum-containing material is selected from the group consisting of zeolites, amorphous aluminosilicates, aluminophosphates, silicoaluminophosphates and metal aluminophosphates. In certain embodiments, the aluminum-containing material is a zeolite selected from the group consisting of *BEA zeolite, USY zeolite and ZSM-5 zeolite. In certain embodiments, the aluminum-containing material is a zeolite selected from the group consisting of *BEA zeolite, FAU zeolite and MFI zeolite. In the process herein, dealumination optimizes the number of acid sites, for example in a zeolite structure.

In certain embodiments, the aluminum-containing material is a zeolite selected from the group consisting of ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, —CHI, —CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, —IFT, —IFU, IFW, IFY, IHW, IMF, IRN, IRR, —IRY, ISV, ITE, ITG, ITH, ITR, ITT, —ITV, ITW, IWR, IWS, IWV, IWW, JBW, JNT, JOZ, JRY, JSN, JSR, JST, JSW, KFI, LAU, LEV, LIO, —LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, —PAR, PAU, PCR, PHI, PON, POR, POS, PSI, PTO, PTT, PTY, PUN, PWN, PWO, PWW, RHO, —RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, —SVR, SVV, SWY, —SYT, SZR, TER, THO, TOL, TON, TSC, TUN, UEI, UFI, UOS, UOV, UOZ, USI, UTL, UWY, VET, VFI, VNI, VSV, WEI, —WEN, YFI, YUG, ZON, *BEA, *CTH, *—EWT, *—ITN, *MRE, *PCS, *SFV, *—SSO, *STO, *—SVY and *UOE (wherein the foregoing abbreviations correspond to those designated by the IZA).

In certain embodiments, the aluminum-containing material comprises silicon-substituted aluminophosphates, silicoaluminophosphate (SAPOs), which include but are not limited to (AEI) including SAPO-18, (AEL) including SAPO-11, (AFI) including SAPO-5, (AFO) including SAPO-41, (AFR) including SAPO-40, (AFX) including SAPO-56, (ATN) including SAPO-39, (ATO) including SAPO-31, (CHA) including SAPO-34 and -47, (FAU) including SAPO-37, (GIS) including SAPO-43, (LEV) including SAPO-35, or (LTA) including SAPO-42 (wherein the foregoing abbreviations correspond to those designated by the IZA).

In certain embodiments, the aluminum-containing material comprises crystalline microporous aluminophosphates (AlPOs), which include but are not limited to (AEI) including AlPO-18, (AEL) including AlPO-11, (AEN) including AlPO-53, (AET) including AlPO-8, (AFI) including AlPO-5, (AFN) including AlPO-14, (AFO) including AlPO-41, (AFR) including AlPO-40; (AFT) including AlPO-52; (ANA) including AlPO-24; (AST) including AlPO-16; (ATO) including AlPO-31; (ATS) including AlPO-36; (ATT) including AlPO-33; (ATV) including AlPO-25; (AWO) including AlPO-21; (AWW) including AlPO-22; (CHA) including AlPO-34; (ERI) including AlPO-17; (LEV) including AlPO-35; (SOD) including AlPO-20; or (VFI) including AlPO-54 (wherein the foregoing abbreviations correspond to those designated by the IZA).

In certain embodiments, the aluminum-containing material comprises metal aluminophosphates (MAPOs) which include but are not limited to (AFI) including MAPO-5; (AFS) including MAPO-46; (ATN) including MAPO-39; (ATO) including MAPO-31; (ATS) including MAPO-36; or (GIS) including MAPO-43 (wherein the foregoing abbreviations correspond to those designated by the IZA).

In certain embodiments, dealumination according to the process herein results in removal of at least about 1-100, 1-99, 1-90, 1-80, 1-70, 1-60, 5-100, 5-99, 5-90, 5-80, 5-70 or 10-70% of aluminum from the aluminum-containing material, for example from the framework thereof.

In certain embodiments, the aluminum-containing material comprises a zeolite and wherein the dealuminated material comprises dealuminated zeolite, and wherein the dealuminated zeolite has an increased silica-to-alumina molar ratio as compared to a silica-to-alumina molar ratio of the zeolite. For example, the silica-to-alumina ratio of the dealuminated zeolite can be greater than the silica-to-alumina molar ratio of the zeolite by about 1-200, 1-80, 5-200 or 5-80. In certain embodiments a zeolite which is dealuminated is ZSM-5 zeolite, and the silica-to-alumina ratio of the dealuminated zeolite is greater than the silica-to-alumina molar ratio of the zeolite by at least about 1-250, 5-250, 10-250, 1-100, 5-100 or 10-100%. In certain embodiments a zeolite which is dealuminated is USY zeolite, and the silica-to-alumina ratio of the dealuminated zeolite is greater than the silica-to-alumina molar ratio of the zeolite by at least about 1-1500, 1-500, 1-250, 1-100, 5-1500, 5-500, 5-250, 5-100, 1-10 or 1-5%. In certain embodiments a zeolite which is dealuminated is beta zeolite, and the silica-to-alumina ratio of the dealuminated zeolite is greater than the silica-to-alumina molar ratio of the zeolite by at least about 1-250, 5-250, 10-250, 1-100, 5-100 or 10-100%.

In embodiments herein, contacting the aluminum-containing material with the acid medium including ODSO occurs in a batch mode in a stirred or agitated vessel. In other embodiments herein, contacting the aluminum-containing material with the acid medium including ODSO occurs in a continuous mode, for example wherein the acid medium in liquid phase contacts the aluminum-containing material in a vessel that includes on-stream removal and replenishment of the aluminum-containing material, and continuous or semi-continuous flow of the liquid acid medium. Suitable equipment includes but is not limited to apparatus in the form of a slurry-bed reactor, an ebullated-bed reactor or a moving-bed reactors.

In embodiments herein, contacting the aluminum-containing material with the acid medium including ODSO occurs under dealumination conditions including: a contact time of between about 0.2-24, 0.2-10, 1-24 or 1-10 hours; a contact temperature in the range of about 15-100, 20-100, 40-100, 15-80, 20-80 or 40-80° C.; a contact pressure in the range of about 1-10 or 1-2 bar, atmospheric pressure; and at a ratio of acid medium to the aluminum-containing material by mass in the range of about 0.1:1 to 40:1, 0.1:1 to 20:1, 0.1:1 to 10:1, 0.1:1 to 5:1, 1:1 to 40:1, 1:1 to 20:1, 1:1 to 10:1, 1:1 to 5:1,2:1 to 40:1, 2:1 to 20:1, 2:1 to 10:1 or 2:1 to 5:1.

Example embodiments of the present disclosure are directed to one or more ODSO compounds that are used as acids in the dealumination of an aluminum-containing material. In certain embodiments the ODSO acid or ODSO acid mixture has a pH of less than 7, less than or equal to 4, or less than or equal to 1. The acid can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In certain embodiments, the ODSO compounds used as the ODSO acid or ODSO acid mixture used in the dealumination of an aluminum-containing material are obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SO—R'), (R—SO—SO—R'), (R—SO—SOO—OH), (R—SOO—SOO—OH), (R—SO—SO—OH), (R—SOO—SO—OH), (R—SO—SO—OR'), (R—SOO—SO—OR'), (R—SO—SOO—OR') and (R—SOO—SOO—OR'). In certain embodiments, in the above formulae R and R' can be the same or different C1-C10 alkyl or C6-C10 aryl. It will be understood that since the source of the DSO is a refinery feedstream, the R substituent vary, e.g., methyl and ethyl subgroups, and the number of sulfur atoms, S, in the as-received feedstream to oxidation can extend to 3, for example, trisulfide compounds.

In certain embodiments the water-soluble compounds and water-insoluble compounds are separated from one another, and the ODSO acid or ODSO acid mixture used in the dealumination of an aluminum-containing material comprise all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments an ODSO acid or ODSO acid mixture medium used for dealumination comprises, consists of or consists essentially of at least one water-soluble ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'). In certain embodiments an ODSO acid or ODSO acid mixture medium used for dealumination comprises, consists of or consists essentially of a mixture or two or more water-soluble ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'). In certain embodiments an ODSO acid or ODSO acid mixture medium used for dealumination comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' can be the same or different C1-C10 alkyl or C6-C10 aryl. In certain embodiments, the R and R' are methyl and/or ethyl groups. In certain embodiments, the ODSO compound (s) used as an acid have 1 to 20 carbon atoms.

In certain embodiments, an ODSO acid or ODSO acid mixture medium used for dealumination comprises, consists of or consists essentially of ODSO compounds having an average density greater than about 1.0 g/cc. In certain embodiments, an ODSO acid or ODSO acid mixture medium used for dealumination comprises, consists of or consists essentially of ODSO compounds having an average boiling point greater than about 80° C. In certain embodiments, an ODSO acid or ODSO acid mixture medium used for dealumination comprises, consists of or consists essentially of ODSO compounds having a dielectric constant that is less than or equal to 100 at 0° C.

Table 1 includes examples of polar water-soluble ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds used as an acid medium for dealumination comprise all or a portion of the ODSO compounds contained in an oxidation effluent stream that is obtained by controlled catalytic oxidation of MEROX process by-products, DSO compounds, as disclosed in U.S. Pat. Nos. 10,807,947 and 10,781,168 and as incorporated herein by reference above.

In some embodiments, the ODSO compounds used as an acid medium for dealumination are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4}O_2 \rightarrow \tfrac{1}{2}RSSR + \tfrac{1}{2}H_2O \quad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

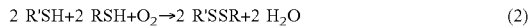

$$2\ R'SH + 2\ RSH + O_2 \rightarrow 2\ R'SSR + 2\ H_2O \quad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C., Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in counter-current flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding disulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds.

The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and their combination. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-insoluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 1, with similar references numbers representing similar units/feeds. In FIG. 2, the effluent stream 1007 from the generalized MEROX unit of FIG. 1 is treated. It will be understood that the processing of the mercaptan containing hydrocarbon stream of FIG. 1 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce ODSO can be carried out in a suitable oxidation reaction vessel operating at a pressure in the range from about 1-30, 1-10 or 1-3 bars. The oxidation to produce ODSO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLE

Figures 3A, 3B:
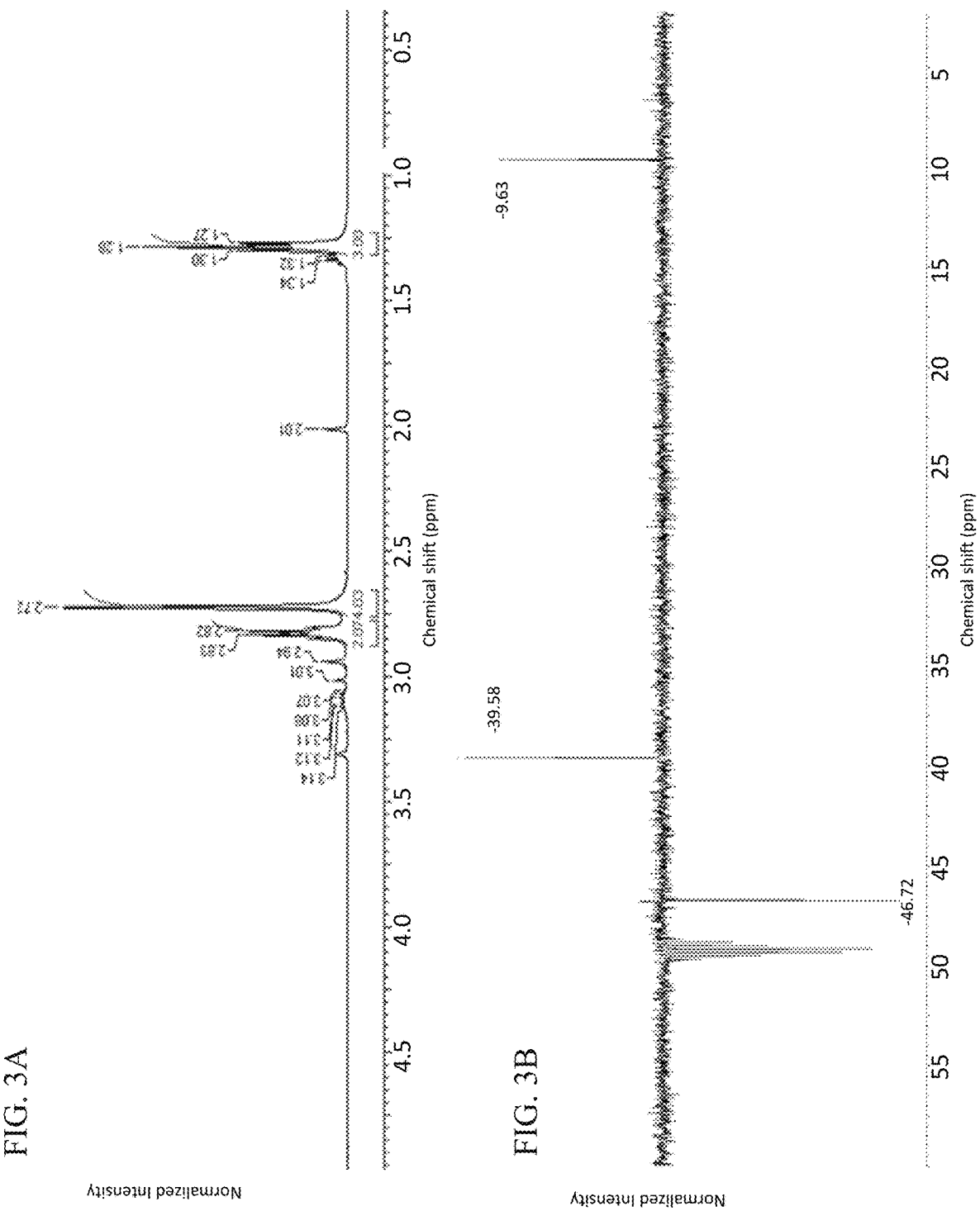
FIG. 3A is the experimental $^1$H-NMR spectrum of the polar, water-soluble ODSO fraction used as an acid medium herein.
FIG. 3B is the experimental $^{13}$C-DEPT-135-NMR spectrum of the polar, water-soluble ODSO fraction used as an acid medium herein.

Reference Example: The ODSO mixture used in the Example below was produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon mono-sulfur content) was 2.90. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^{1}$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a CD$_3$OD solvent and the spectrum was taken at 25° C. Methyl carbons have a positive intensity while methylene carbons exhibit a negative intensity. The peaks in the 48-50 ppm region belong to carbon signals of the CD$_3$OD solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form an ODSO acid medium of the present disclosure as a dealumination agent.

An ODSO solution was prepared by slowly adding 15.3220 g of the undiluted mixture of ODSO compounds to 12.5022 g of distilled water. Thereafter, an additional 31.8878 g of distilled water was added. This dilution method is equivalent to diluting a sulfuric acid reagent from 96 wt. % to 25 wt. %.

Example 1: A commercial ZSM-5 zeolite was received in the ammonium form and was therefore calcined to give the acid (proton) form through the following calcination profile: heat to 120° C. (2° C./min), isotherm for 2 hours, heat to 550° C. (1.5° C./min), isotherm for 8 hours, cool. 20 g of distilled water was added to a round bottom flask containing a magnetic stirrer bar. The round bottom flask was positioned within an oil bath at 70° C. and stirred at 300 rpm. Once at the desired temperature, 2 g of the calcined zeolite was added prior to the addition of 4.7 g of the prepared ODSO solution from the Reference Example. The system was left stirring for 2 hours after which the suspension was vacuum filtered and washed with 100 g distilled water before drying at 110° C. The dried material was calcined under the following calcination profile: heat to 120° C. (2° C./min), isotherm for 2 hours, heat to 550° C. (1.5° C./min), isotherm for 5 hours, cool. Inductively coupled plasma mass spectrometry (ICP-MS) was used to carry out elemental analysis of the as-received ZSM-5 zeolite and the dealuminated zeolite; the silica-to-alumina molar ratio of the as-received ZSM-5 zeolite was 25, and the silica-to-alumina ratio molar of the dealuminated zeolite increased to 28.

Example 2: 20 g of distilled water was added to a round bottom flask containing a magnetic stirrer bar. The round bottom flask was positioned within an oil bath at 70° C. and stirred at 300 rpm. Once at the desired temperature, 2 g of a commercial USY zeolite was added prior to the addition of 4.7 g of the prepared ODSO solution from the Reference Example. The system was left stirring for 2 hours after which the suspension was vacuum filtered and washed with 100 g distilled water before drying at 110° C. The dried material was calcined under the following calcination profile: heat to 120° C. (2° C./min), isotherm for 2 hours, heat to 550° C. (1.5° C./min), isotherm for 5 hours, cool. ICP-MS was used to carry out elemental analysis of the as-received USY zeolite and the dealuminated zeolite; the silica-to-alumina molar ratio was increased from 5 in the as-received USY zeolite to 7 in the dealuminated zeolite.

Example 3: A commercial zeolite beta was received in the ammonium form and was therefore calcined to give the acid (proton) form through the following calcination profile: heat to 120° C. (2° C./min), isotherm for 2 hours, heat to 550° C. (1.5° C./min), isotherm for 8 hours, cool. 20 g of distilled water was added to a round bottom flask containing a magnetic stirrer bar. The round bottom flask was positioned within an oil bath at 50° C. and stirred at 300 rpm. Once at the desired temperature, 2 g of the calcined zeolite was added prior to the addition of 4.7 g of the prepared ODSO solution from the Reference Example. The system was left stirring for 2 hours after which the suspension was vacuum filtered and washed with 100 g distilled water before drying at 110° C. The dried material was calcined under the following calcination profile: heat to 120° C. (2° C./min), isotherm for 2 hours, heat to 550° C. (1.5° C./min), isotherm for 5 hours, cool. ICP-MS was used to carry out elemental analysis of the as-received zeolite beta and the dealuminated zeolite; the silica-to-alumina molar ratio was increased from 27 in the as-received zeolite beta to 78 in the dealuminated zeolite.

The methods of dealuminating an aluminum-containing material using ODSO as a substitute for all or a portion of a conventional acid medium as described above and characterized in the attached figures are exemplary, and process modifications and variations will be apparent to those of ordinary skill in the art and the scope of protection for the invention is to be defined by the claims that follow.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
|---|---|---|
| Dialkyl-sulfonesulfoxide Or 1,2-alkyl-alkyl-disulfane 1,1,2-trioxide | (R—SOO—SO—R') | $H_3C-S(=O)_2-S(=O)-CH_3$ <br> 1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | $H_3C-S(=O)_2-S(=O)_2-CH_3$ <br> 1,2-Dimethyldisulfane 1,1,2,2-tetraoxide |
| Alkyl-sulfoxidesulfonate | (R—SO—SOO—OH) | $H_3C-S(=O)-S(=O)_2-OH$ <br> Methylsulfanesulfonic acid oxide |
| Alkyl-sulfonesulfonate | (R—SOO—SOO—OH) | $H_3C-S(=O)_2-S(=O)_2-OH$ <br> 1-Hydroxy-2-methyldisulfane 1,1,2,2-tetraoxide |
| Alkyl-sulfoxidesulfinate | (R—SO—SO—OH) | $H_3C-S(=O)-S(=O)-OH$ <br> 1-Hydroxy-2-methyldisulfane 1,2-dioxide |

TABLE 1-continued

| ODSO Name | Formula | Structure Examples |
|---|---|---|
| Alkyl-sulfonesulfinate | (R—SOO—SO—OH) | $H_3C-\overset{\overset{O}{\|}}{\underset{\underset{O}{\|}}{S}}-\overset{\overset{O}{\|}}{S}-OH$ <br> Methylsulfanesulfinic acid dioxide |

R and R' can be the same or different C1-C10 alkyl or C6-C10 aryl.

What is claimed is:

1. A method for dealuminating an aluminum-containing material including an aluminum-containing inorganic oxide or an aluminum-based metal organic framework material, the method comprising contacting the aluminum-containing material with an acid medium comprising one or more water-soluble oxidized disulfide oil (ODSO) compounds, and recovering a dealuminated material.

2. The method as in claim 1, wherein the aluminum-containing material is selected from the group consisting of zeolites, amorphous aluminosilicates, aluminophosphates, silicoaluminophosphates and metal aluminophosphates.

3. The method as in claim 1, wherein the aluminum-containing material is a zeolite selected from the group consisting of zeolite beta, USY zeolite and ZSM-5 zeolite.

4. The method as in claim 1, wherein the aluminum-containing material is a zeolite selected from the group consisting of *BEA, FAU and MFI.

5. The method as in claim 1, wherein the aluminum-containing material is a zeolite selected from the group consisting of ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, —CHI, —CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, —IFT, —IFU, IFW, IFY, IHW, IMF, IRN, IRR, —IRY, ISV, ITE, ITG, ITH, ITR, ITT, —ITV, ITW, IWR, IWS, IWV, IWW, JBW, JNT, JOZ, JRY, JSN, JSR, JST, JSW, KFI, LAU, LEV, LIO, —LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, —PAR, PAU, PCR, PHI, PON, POR, POS, PSI, PTO, PTT, PTY, PUN, PWN, PWO, PWW, RHO, —RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, —SVR, SVV, SWY, —SYT, SZR, TER, THO, TOL, TON, TSC, TUN, UEI, UFI, UOS, UOV, UOZ, USI, UTL, UWY, VET, VFI, VNI, VSV, WEI, —WEN, YFI, YUG, ZON, *BEA, *CTH, *—EWT, *—ITN, *MRE, *PCS, *SFV, *—SSO, *STO, *—SVY and *UOE.

6. The method as in claim 1, wherein about 1-100%, of aluminum is removed from the aluminum-containing material.

7. The method as in claim 1, wherein the aluminum-containing material comprises a zeolite and wherein the dealuminated material comprises dealuminated zeolite, and wherein the dealuminated zeolite has an increased silica-to-alumina molar ratio as compared to a silica-to-alumina molar ratio of the zeolite.

8. The method as in claim 7, wherein the silica-to-alumina ratio of the dealuminated zeolite is greater than the silica-to-alumina molar ratio of the zeolite by about 1-200.

9. The method as in claim 7, wherein the zeolite is ZSM-5 zeolite and wherein the silica-to-alumina ratio of the dealuminated zeolite is greater than the silica-to-alumina molar ratio of the zeolite by at least about 1-250%.

10. The method as in claim 7, wherein the zeolite is USY zeolite and wherein the silica-to-alumina ratio of the dealuminated zeolite is greater than the silica-to-alumina molar ratio of the zeolite by at least about 1-1500%.

11. The method as in claim 7, wherein the zeolite is beta zeolite and wherein the silica-to-alumina ratio of the dealuminated zeolite is greater than the silica-to-alumina molar ratio of the zeolite by at least about 1-250%.

12. The method as in claim 1, wherein contacting the aluminum-containing material occurs in a batch mode in a stirred or agitated vessel, or in a continuous mode wherein the acid medium in liquid phase contacts the aluminum-containing material in a vessel that includes on-stream removal and replenishment of the aluminum-containing material, for example slurry-bed, ebullated-bed or moving-bed reactors, and continuous or semi-continuous flow of liquid acid medium, and wherein contacting the aluminum-containing material with the acid medium occurs under dealumination conditions including:
a contact time of between about 0.2-24 hours;
a contact temperature in the range of about 15-100° C.;
a contact pressure in the range of about 1-10;
at a ratio of acid medium to the aluminum-containing material by mass in the range of about 0.1:1 to 40:1.

13. The method as in claim 1, wherein the acid medium has a pH less than 7.

14. The method as in claim 1, wherein the acid medium comprises an aqueous solution.

15. The method as in claim 1, wherein the acid medium further comprises one or more additional acidic components, wherein the one or more additional acidic components are selected from the group consisting of hydrochloric acid, sulfuric acid, nitric acid, aqua regia, citric acid and acetic acid.

16. The method as in claim 1, wherein the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'), wherein R and R' can be the same or different C1-C10 alkyl or C6-C10 aryl.

17. The method as in claim 1, wherein the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SOO—SO—OH), (R—SO—SO—OR'), (R—SOO—SO—OR'), (R—SO—SOO—OR') and (R—SOO—SOO—OR'), wherein R and R' can be the same or different C1-C10 alkyl or C6-C10 aryl.

18. The method of claim 17, wherein the mixture corresponds to oxidized disulfide oils present in an effluent refinery hydrocarbon stream recovered following catalytic oxidation of mercaptans present in the effluent refinery hydrocarbon stream.

19. The method as in claim 1, wherein the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

20. The method as in claim 1, wherein the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

* * * * *